United States Patent
Billhartz et al.

(10) Patent No.: US 7,321,777 B2
(45) Date of Patent: *Jan. 22, 2008

(54) WIRELESS COMMUNICATIONS SYSTEM INCLUDING A WIRELESS DEVICE LOCATOR AND RELATED METHODS

(75) Inventors: Thomas Jay Billhartz, Melbourne, FL (US); Vivek Krishna, Palm Bay, FL (US); Steve Kopman, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/531,487

(22) Filed: Sep. 13, 2006

(65) Prior Publication Data

US 2007/0026873 A1    Feb. 1, 2007

Related U.S. Application Data

(63) Continuation of application No. 10/767,794, filed on Jan. 29, 2004, now Pat. No. 7,110,779.

(51) Int. Cl.
*H04Q 7/20* (2006.01)

(52) U.S. Cl. .................. 455/456.2; 455/456.1; 455/456.5; 455/456.6; 342/457; 370/328

(58) Field of Classification Search ...... 455/41.2–41.3, 455/456.1–457, 553.1, 63.4, 562.1, 67.11, 455/67.13, 67.16, 402.2; 342/357.08–357.09, 342/357.1, 450; 340/426.19, 426.22, 539.23, 340/825.49; 370/310.2, 328, 331, 338; 701/201; 702/149
See application file for complete search history.

(56) References Cited

U.S. PATENT DOCUMENTS

| | | | |
|---|---|---|---|
| 5,526,357 A | 6/1996 | Jandrell | 370/95.2 |
| 5,550,549 A | 8/1996 | Procter, Jr. et al. | 342/47 |
| 5,687,196 A | 11/1997 | Proctor, Jr. et al. | 375/347 |
| 5,706,010 A | 1/1998 | Franke | 342/47 |
| 6,292,665 B1 | 9/2001 | Hildebrand et al. | 455/456 |
| 6,680,923 B1 | 1/2004 | Leon | 370/328 |
| 6,865,394 B2 | 3/2005 | Ogino et al. | 455/456.1 |

(Continued)

OTHER PUBLICATIONS

Yellowjacket-A, 802.11a Wi-Fi Analysis System, Berkeley Varitronics Systems.

*Primary Examiner*—George Eng
*Assistant Examiner*—Kamran Afshar
(74) *Attorney, Agent, or Firm*—Allen, Dyer, Doppelt, Milbrath & Gilchrist, P.A.

(57) ABSTRACT

A wireless communications system may include a plurality of wireless communications devices and a wireless device locator. More particularly, the wireless device locator may include at least one antenna and a transceiver connected thereto, and a controller for cooperating with the transceiver for transmitting a plurality of location finding signals to a target wireless communications device from among the plurality thereof. The target device may transmit a respective reply signal for each of the location finding signals. Additionally, the controller may also cooperate with the transceiver for receiving the reply signals, and it may determine a propagation delay associated with the transmission of each location finding signal and the respective reply signal therefor based upon a known device latency of the target device. As such, the controller may estimate a range to the target device based upon a plurality of determined propagation delays.

25 Claims, 9 Drawing Sheets

U.S. PATENT DOCUMENTS

| | | |
|---|---|---|
| 6,990,428 B1 * | 1/2006 | Kaiser et al. ............ 455/456.1 |
| 7,042,868 B2 * | 5/2006 | Runkle et al. ............... 370/347 |
| 7,046,987 B2 * | 5/2006 | Siegel et al. ............. 455/404.2 |
| 7,110,779 B2 * | 9/2006 | Billhartz et al. ......... 455/456.2 |
| 2002/0080759 A1 | 6/2002 | Harrington et al. ......... 370/338 |
| 2002/0118655 A1 | 8/2002 | Harrington et al. ......... 370/328 |
| 2002/0171586 A1 | 11/2002 | Martorana et al. .......... 342/458 |
| 2003/0025602 A1 | 2/2003 | Medema et al. ......... 340/568.1 |
| 2003/0034887 A1 | 2/2003 | Crabtree et al. ............ 340/539 |
| 2003/0043073 A1 | 3/2003 | Gray et al. ................. 342/465 |
| 2003/0117320 A1 * | 6/2003 | Kim et al. .................. 342/457 |
| 2003/0128163 A1 * | 7/2003 | Mizugaki et al. ........... 342/464 |
| 2003/0162550 A1 | 8/2003 | Kuwahara et al. ........... 455/456 |
| 2003/0182062 A1 | 9/2003 | DeLorne et al. ............. 701/201 |
| 2003/0191604 A1 | 10/2003 | Kuwahara et al. ........... 702/150 |
| 2004/0072566 A1 * | 4/2004 | Kuwahara et al. ........... 455/440 |
| 2004/0081139 A1 | 4/2004 | Beckmann et al. ......... 370/352 |
| 2004/0110514 A1 | 6/2004 | Kim et al. ................ 455/456.1 |
| 2004/0203889 A1 | 10/2004 | Karaoguz ................. 455/456.1 |
| 2004/0266348 A1 | 12/2004 | Deshpande et al. ......... 455/41.2 |
| 2005/0037775 A1 | 2/2005 | Moeglein et al. ........ 455/456.1 |
| 2005/0059411 A1 | 3/2005 | Zhengdi .................. 455/456.1 |
| 2006/0183488 A1 * | 8/2006 | Billhartz .................. 455/456.5 |

* cited by examiner

WIRELESS COMMUNICATIONS SYSTEM INCLUDING A WIRELESS DEVICE LOCATOR AND RELATED METHODS

FIELD OF THE INVENTION

The present application is a continuation of U.S. patent application serial No. 10/767,794 filed Jan. 29, 2004 now U.S. Pat. No. 7,110,779, the entire content of which is incorporated herein by reference.

BACKGROUND OF THE INVENTION wireless location techniques are used in numerous applications. Perhaps the most basic of these applications is for locating lost articles. By way of example, published U.S. patent application Ser. No. 2003/0034887 to Crabtree et al. discloses a portable article locator system for locating lost articles such as glasses, keys, pets, television remotes, etc. More particularly, a wireless transceiver is attached to a person, animal, or other object. A handheld locator transmits a locator signal to the wireless transceiver which includes a unique address code of the transceiver. If the received code matches that stored by the wireless transceiver, it sends a return signal back to the locator device. The locator device uses the return signal to determine the distance and/or direction to the wireless transceiver from the user's location.

The locator device includes an antenna array which includes a plurality of omni-directional antennas. The locator unit determines the bearing to the wireless transceiver by switching between antennas in the antenna array and using Doppler processing to determine a direction of a wireless signal received from the transceiver. The distance to the wireless transmitter is also determined based upon the reception of the wireless signal at each of the antennas of the antenna array. Furthermore, in one embodiment, which is intended to avoid interference between two or more locators in a common area, a plurality of locator signals may be sent from a locator at a standard repetition rate. The locator's receiver then only listens for responses during predetermined windows following each transmission.

In contrast, in some applications it is desirable to determine the location of an unknown signal transmitter. U.S. Pat. No. 5,706,010 to Franke discloses such a system in which a transmitter locator receives a signal from the unknown signal transmitter and processes the signal to determine a bearing to the unknown signal transmitter. The transmitter locator then sends an interrogating signal to the unknown signal transmitter. Upon receiving the interrogating signal, the unknown signal transmitter heterodynes the interrogation signal with its own carrier signal to generate an intermodulation return signal. A processor of the transmitter locator measures the round-trip transit time from the transmission of the interrogation signal to the reception of the intermodulation return signal. A range to the unknown signal transmitter is then calculated based upon the round-trip transit time.

Still another application in which locating a wireless communications device is often necessary is in cellular telephone networks. That is, it may be necessary to locate particular cellular telephone users for law enforcement or emergency purposes, for example. U.S. Pat. No. 6,292,665 to Hildebrand et al., which is assigned to the present assignee, discloses a method for geolocating a cellular phone initiating a 911 call. A base station transceiver transmits a supervisory audio tone (SAT), which is automatically looped back by the calling cellular phone. Returned SAT signals are correlated with those transmitted to determine the range of the cellular phone. In addition, incoming signals from the cellular phone, such as the returned SAT signals, are received by a phased array antenna and subjected to angle of arrival processing to determine the direction of the cellular phone relative to the base station. The cellular phone is geolocated based upon the angle of arrival and the range information. A correction factor provided by the manufacturer of a given cellular telephone is used to account for the loopback path delay through the phone.

One additional area in which wireless device location can be important is in wireless networks, such as wireless local area networks (WLANs) or wide area networks (WANs), for example. A typical prior art approach to locating terminals within a WLAN includes locating a plurality of receivers at fixed locations within a building, for example, and then determining (i.e., triangulating) the position of a terminal based upon a signal received therefrom at each of the receivers.

Another prior art approach for wireless terminal location is to use a direction finding (DF) device which includes a directional antenna for receiving signals when pointed in the direction of a transmitting node. An example of a portable DF device for WLANs is the Yellowjacket 802.11a wi-fi analysis system from Berkeley Varitronics. This device uses a passive DF technique, i.e., it does not solicit any signals from a terminal but instead waits for the terminal to transmit signals before it can determine the direction of the transmission.

Despite the advantages of such prior art wireless communications device locators, additional wireless location features may be desirable in various applications.

SUMMARY OF THE INVENTION

In view of the foregoing background, it is therefore an object of the present invention to provide a wireless communications device locator which provides enhanced location features and related methods.

This and other objects, features, and advantages in accordance with the present invention are provided by a wireless communications system which may include a plurality of wireless communications devices each having a device type associated therewith from among a plurality of different device types. Further, each device type may have a known device latency associated therewith. The system may also include a wireless device locator. More particularly, the wireless device locator may include at least one antenna and a transceiver connected thereto, and a controller for cooperating with the transceiver for transmitting a plurality of location finding signals to a target wireless communications device from among the plurality of wireless communications devices. The target wireless communications device may transmit a respective reply signal for each of the location finding signals.

Additionally, the controller of the wireless device locator may also cooperate with the transceiver for receiving the reply signals, and it may determine a propagation delay associated with the transmission of each location finding signal and the respective reply signal therefor. This may be done based upon the known device latency of the target wireless communications device. As such, the controller may estimate a range to the target wireless communications device based upon a plurality of determined propagation delays.

In other words, the wireless device locator advantageously provides active range finding. In other words, the wireless device locator prompts the target wireless communications device to send reply signals using the location finding signals, rather than passively waiting until the target wireless communications device begins transmitting. This allows for quicker and more efficient device location.

Furthermore, by estimating the range based upon a plurality of propagation delays, the wireless device locator mitigates the effects of variations in the device latency time. That is, while the target wireless communication device has a known device latency, there will necessarily be some amount of variance from one transmission to the next. Using a plurality of propagation delays associated with different transmissions provides a significantly more accurate approximation of the device latency time and, thus, a more accurate range estimation. By way of example, the controller may estimate the range based upon an average (e.g., mean, median, mode, etc.) of the propagation delays.

In addition, each wireless communications device may have a unique identifier (UID) associated therewith, and the controller may insert the UID for the target wireless communications device in each of the location finding signals. Furthermore, the target wireless communications device may generate respective reply signals based upon the UID in the location finding signals. That is, the target wireless communications device will act upon the location finding signals because these signals include its UID, whereas the other wireless communications device will not.

The target wireless communications device may generate unsolicited signals including the UID thereof. As such, the controller may cooperate with the transceiver to receive at least one unsolicited signal from the target device, and the controller may also determine the UID for the target device from the at least one unsolicited signal. Thus, if the UID of a target wireless communications device is not already known, the wireless device locator may passively "listen" for unsolicited signals therefrom (i.e., signals that the wireless communications device did not solicit) and determine the UID based thereon.

Additionally, the controller may also determine the device type of the target wireless communications device based upon the UID. By way of example, the UIDs may include media access control (MAC) addresses of respective wireless communications devices. Accordingly, the controller may determine the device type of the target wireless communications device based upon the MAC address in some applications.

In accordance with another advantageous aspect of the invention, the at least one antenna may be a plurality of antennas, and the controller may cooperate with the plurality of antennas to determine a bearing to the target wireless communications device based upon at least one of the received reply signals. More particularly, the bearing may be a three-dimensional bearing, which may be particularly useful for locating wireless communications devices within a multi-story building, for example. In particular, the antenna(s) may be one or more directional antennas, for example. Further, the wireless device locator may further include a portable housing carrying the at least one antenna, the transceiver, and the controller.

The wireless device locator may be used with numerous type of wireless communications device. For example, the wireless communications devices may be wireless local area network (WLAN) devices, mobile ad-hoc network (MANET) devices, and cellular communications devices.

A method aspect of the invention is for locating a target wireless communications device from among a plurality of wireless communications devices, such as those discussed briefly above. The method may include transmitting a plurality of location finding signals to the target wireless communications device, and receiving a respective reply signal for each of the location finding signals therefrom. The method may further include determining a propagation delay associated with the transmission of each location finding signal and the respective reply signal therefor based upon the known device latency of the target wireless communications device. As such, a range to the target wireless communications device may be estimated based upon a plurality of determined propagation delays.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in different embodiments.

Figure 1:
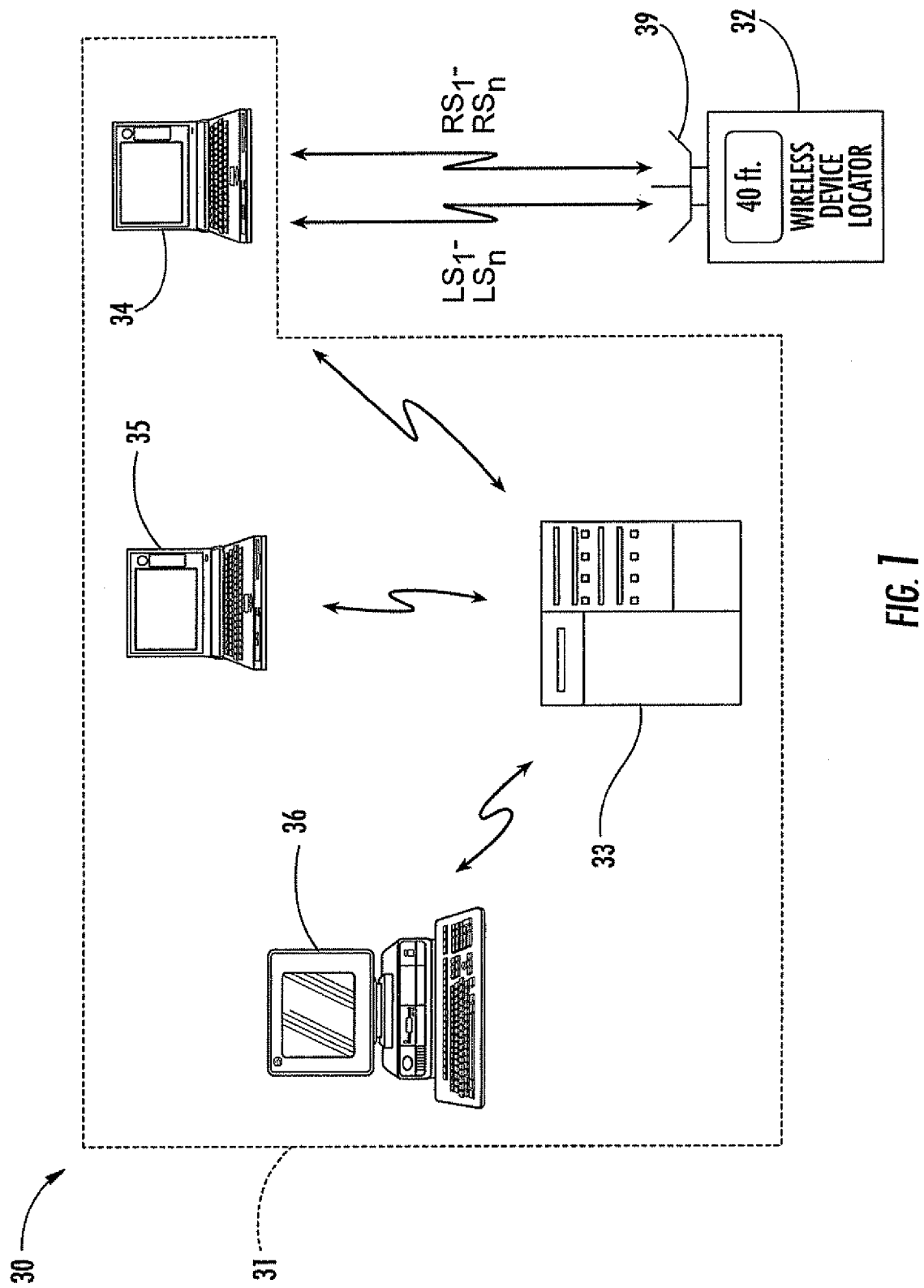
FIG. 1 is schematic block diagram of a wireless communications system in accordance with the present invention including a wireless local area network (WLAN) and wireless device locator for locating WLAN devices thereof.
Figure 2:
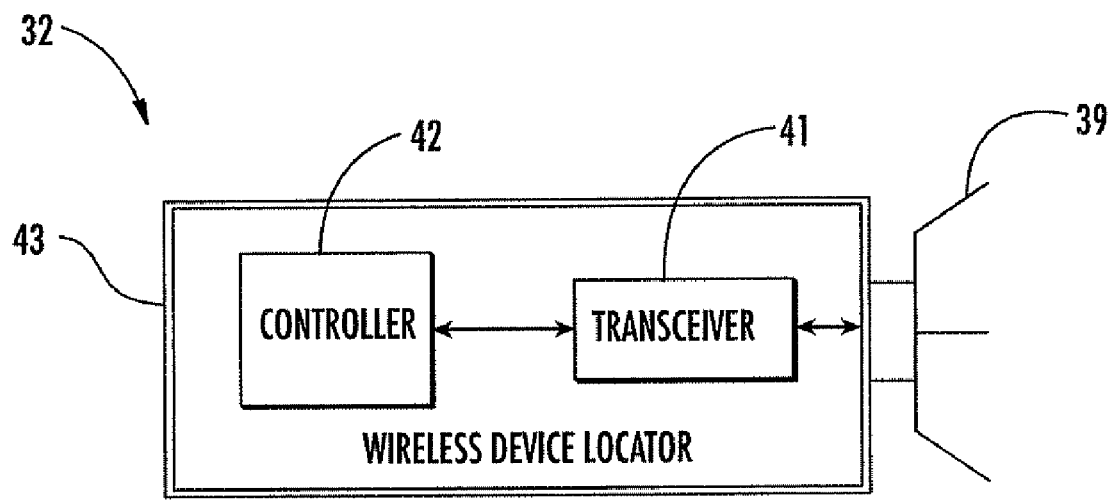
FIG. 2 is a schematic block diagram generally illustrating the components of the wireless device locator of FIG. 1.

Referring initially to FIGS. 1 and 2, a wireless communications system 30 illustratively includes a wireless local area network (WLAN) 31 and a wireless location device 32. The WLAN 31 illustratively includes an access point 33 (e.g., a server) and a plurality of WLAN devices or terminals which communicate therewith wirelessly, such as the laptop computers 34, 35, and the desktop computer 36. Various WLAN protocols may be used in accordance with the present invention for such wireless communications (e.g., IEEE 802.11, Bluetooth, etc.), as will be appreciated by those of skill in the art. Moreover, it will also be appreciated that additional access points and/or other numbers of wireless communications devices may be used, even though only a few number thereof are shown for clarity of illustration. Further, numerous other types of WLAN enabled wireless communications devices (e.g., personal data assistants, etc.) may also be used, as will be further appreciated by those skilled in the art.

Each wireless communications device 34-36 in the WLAN 31 has a device type associated therewith from among a plurality of different device types. More particularly, the device type may signify the particular manufacturer and/or model of a given WLAN card or chip set used therein. In some embodiments, it may also signify the standard the device complies with (e.g., IEEE 802.11).

The device type is important in that different device types will have known device latencies associated therewith. For example, different WLAN cards or chip sets will have a certain latency associated with the time they take to process a received signal and generate an acknowledgement reply thereto. These delay times may be fairly consistent across different models from a same manufacturer, or they may vary significantly. Additionally, WLAN protocols such as IEEE 802.11 have a specified interframe spacing associated therewith, as will be appreciated by those skilled in the art. Thus, in circumstances where the interframe spacing requirements are closely adhered to, the latency of a given WLAN card or chip set will be substantially equal to the interframe spacing.

The wireless device locator 32 illustratively includes an antenna 39 and a transceiver 41 connected thereto, as well as a controller 42 connected to the transceiver. These components may conveniently be carried by a portable housing 43 in some embodiments, although they could be implemented in a more stationary embodiment, if desired. In the illustrated example, the antenna 39 is a directional antenna, although omni-directional antennas may also be used, as will be appreciated by those skilled in the art. It will also be appreciated that various antenna/transceiver combinations may be used. As will be discussed further below, more than one antenna may be used in certain embodiments to provide bearing determination capabilities, and separate transceivers may optionally be used for respective antennas, if desired.

Figure 3:
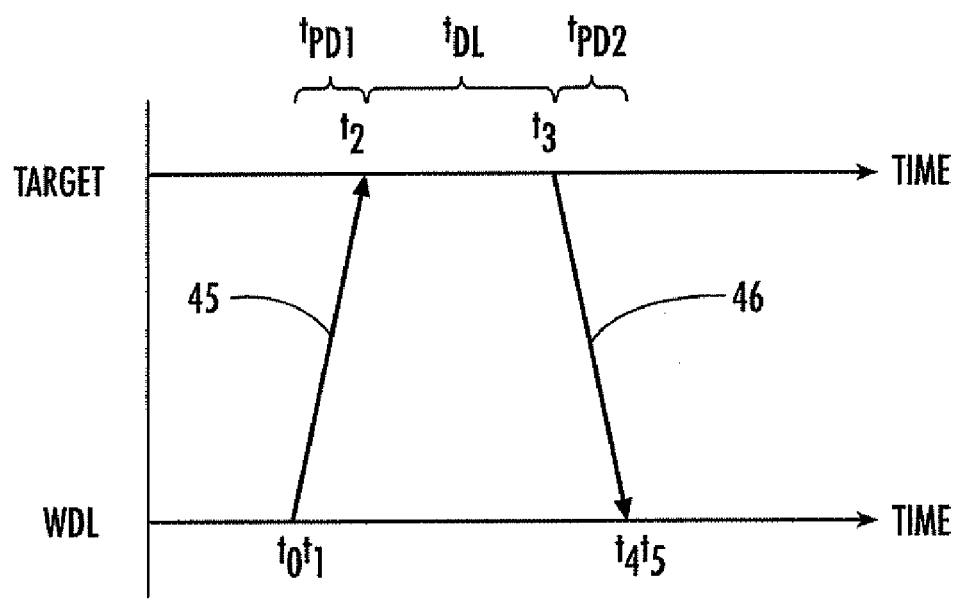
FIG. 3 is a graph illustrating the signal propagation delay and device latency components used by the controller of FIG. 2 to estimate range.

Operation of the wireless device locator 32 will now be described with reference to FIG. 3. The controller 42 cooperates with the transceiver 41 for transmitting a plurality of location finding signals to a target wireless communications device to be located from among the plurality of wireless communications devices. In the present example, the laptop 34 is the target device.

As will be appreciated by those skilled in the art, each WLAN device 34-36 in the network 31 will have a unique identifier (UID) associated therewith which is used in signals transmitted between the respective devices and the access point 33. The UID distinguishes the devices 34-36 from one another so that each device only acts upon or responds to signals intended for it, and so the access point 33 knows which device it is receiving signals from.

Depending upon a given implementation, the wireless locator device 32 may or may not know the UID of the target device 34 before hand. For example, in some embodiments the wireless device locator 32 could download the UID from the access point 33 (either wirelessly or over a wired network connection, for example). This may be the case when trying to locate a node in a LAN where the node is already registered with the network. However, if the UID is not known, the wireless device locator 32 may passively listen to the target device 34 for unsolicited signals being transmitted therefrom. This feature may be advantageous for law enforcement applications, or for locating an interfering node that is not registered with a particular network but causes interference therewith, for example. By "unsolicited" signals it is meant that these signals are not solicited by the wireless device locator 32 itself, although such signals may have been solicited from another source (e.g., the access point 33).

The controller 42 cooperates with the transceiver 41 to receive one or more of the unsolicited signals, and the controller determines the UID for the target device 34 therefrom. Of course, the method by which the controller 42 determines the UID from the unsolicited signal will depend upon the given implementation, and whether or to what degree such signals are encrypted.

Additionally, the controller 42 may also determine the device type of the target wireless communications device 34 based upon the UID thereof. By way of example, the UIDs may include media access control (MAC) addresses of respective wireless communications devices. The MAC addresses may be specific to a particular type of device manufacturer, or indicate a particular operational protocol with which the device is operating, as will be appreciated by those skilled in the art. Accordingly, the controller may determine the device type of the target wireless communications device 34 based upon the MAC address thereof in some applications.

As such, to locate the target device 34, the controller inserts the UID therefor in each of the location finding signals. By way of example, the location finding signal may include the UID of the target device 34 in a header packet and a valid but empty data packet. This will force the target device 34 to generate a reply signal acknowledging receipt of the location finding signal (i.e., an ACK signal). Of course, various other location finding signals could be used to cause the target terminal 34 to generate an ACK signal, as will be appreciated by those skilled in the art. The controller 42 cooperates with the transceiver 41 for receiving the reply signals from the target device 34 via the antenna 39. The location finding signals and reply signals may be radio frequency (RF), microwave, optical, or other suitable types of signals, as will be appreciated by those skilled in the art.

The controller 42 determines the propagation delay associated with the transmission of each location finding signal and the respective reply signal therefor, and it uses this propagation delay to estimate a range to the target device 34. However, the propagation delay has to first be determined based upon the total round trip time from the sending of the location finding signal to the reception of the respective reply signal.

The total round trip time will include several components. Referring more particularly to FIG. 3, the first component is the time associated with transmitting a location finding signal 45, which is illustrated with an arrow. That is, this is the time from the beginning of the location finding signal transmission (time $t_0$) to end thereof (time $t_1$). Two time axes are shown in FIG. 3. The top or upper axis represents events that occur at the target device 34, while the bottom or lower axis represents events that occur at the wireless device locator 32.

The second component of the round trip time is the propagation delay or time $t_{PD1}$ it takes for the location finding signal 45 to travel from the wireless device locator 32 to the target device 34 (i.e., from time $t_1$ to $t_2$). The third component of the round trip time is the device latency $t_{DL}$ of the target device 34 (i.e., form time $t_2$ to $t_3$). This is the time it takes the target device 34 to receive, process, and transmit a reply signal 46 responsive to the location finding signal 45.

The final components of the round trip time are propagation delay $t_{PD2}$ of the reply signal 46 (i.e., from time $t_3$ to $t_4$), and the reception time thereof by the wireless device locator 32 (i.e., from time $t_4$ to $t_5$).

The controller 42 will know the times associated with the transmission of the location finding signal 45 (i.e., from time $t_0$ to $t_1$), as well as the time associated with the reception of the reply signal 46 (i.e., from time $t_4$ to $t_5$) for each round trip, since these can be readily measured by the controller. The quantities that the controller 42 will not know are the propagation delays $t_{PD1}$, $t_{PD2}$ and the actual device latency $t_{DL}$.

Yet, as noted above, the controller 42 will have access to the known device latency (i.e., a mean latency) for the given device type of the target device 34, which provides a close approximation of the actual device latency $t_{DL}$. The known device latency could be a measured value based upon collected data, it could be provided by manufacturers, or it could be based upon a value set in a communications standard, as discussed above, for example.

As will be appreciated by those skilled in the art, the actual device latency will likely vary somewhat from one transmission to the next for any wireless communications device, potentially by as little as a few nanoseconds to a few microseconds, depending upon device configurations, processing loads, etc. Accordingly, a close approximation of the total propagation delay (i.e., time $t_{PD1}$+time $t_{PD2}$) may therefore be obtained by substituting the known device latency for the actual device latency $t_{DL}$, and subtracting this value from the time between times $t_1$ and $t_4$. Dividing the total propagation delay by two (since both propagation delays may be considered equal or substantially equal for a stationary or relatively slow moving target device 34) and multiplying this by the speed of light gives the estimated distance to the target device 39, based upon the single propagation delay associated with the signal pair 45, 46.

Yet, as noted above, device latencies tend to vary from one transmission to the next. Since the location finding signals and reply signals are traveling at the speed of light, such variances can make a significant difference in the estimated distances. More particularly, light travels approximately 1000 ft. in one microsecond. Thus, if the device latency varies by one microsecond from one transmission to the next, the estimated distance to the target device 34 would similarly vary by 1000 ft. or so, which likely will be an unacceptable accuracy for many applications.

In accordance with the present invention, the controller 42 advantageously estimates the range to the target device 34 not solely based upon a single measured propagation delay, but rather upon a plurality thereof. More particularly, by estimating the range based upon a plurality of propagation delays, the wireless device locator 32 mitigates the effects of the variations in the actual device latency time. This provides a significantly more accurate approximation of the device latency time and, thus, a more accurate range estimation. By way of example, the controller 42 may estimate the range based upon an average of the propagation delays, though other suitable statistical functions may also be used (e.g., mean, median, mode, etc.). Of course, it should be noted that the average may be taken on the entire round trip delay instead of first subtracting out the known device latency as described above. That is, the same result may be obtained by first taking the average and then subtracting out the known device latency, as will be appreciated by those skilled in the art.

Figure 4:
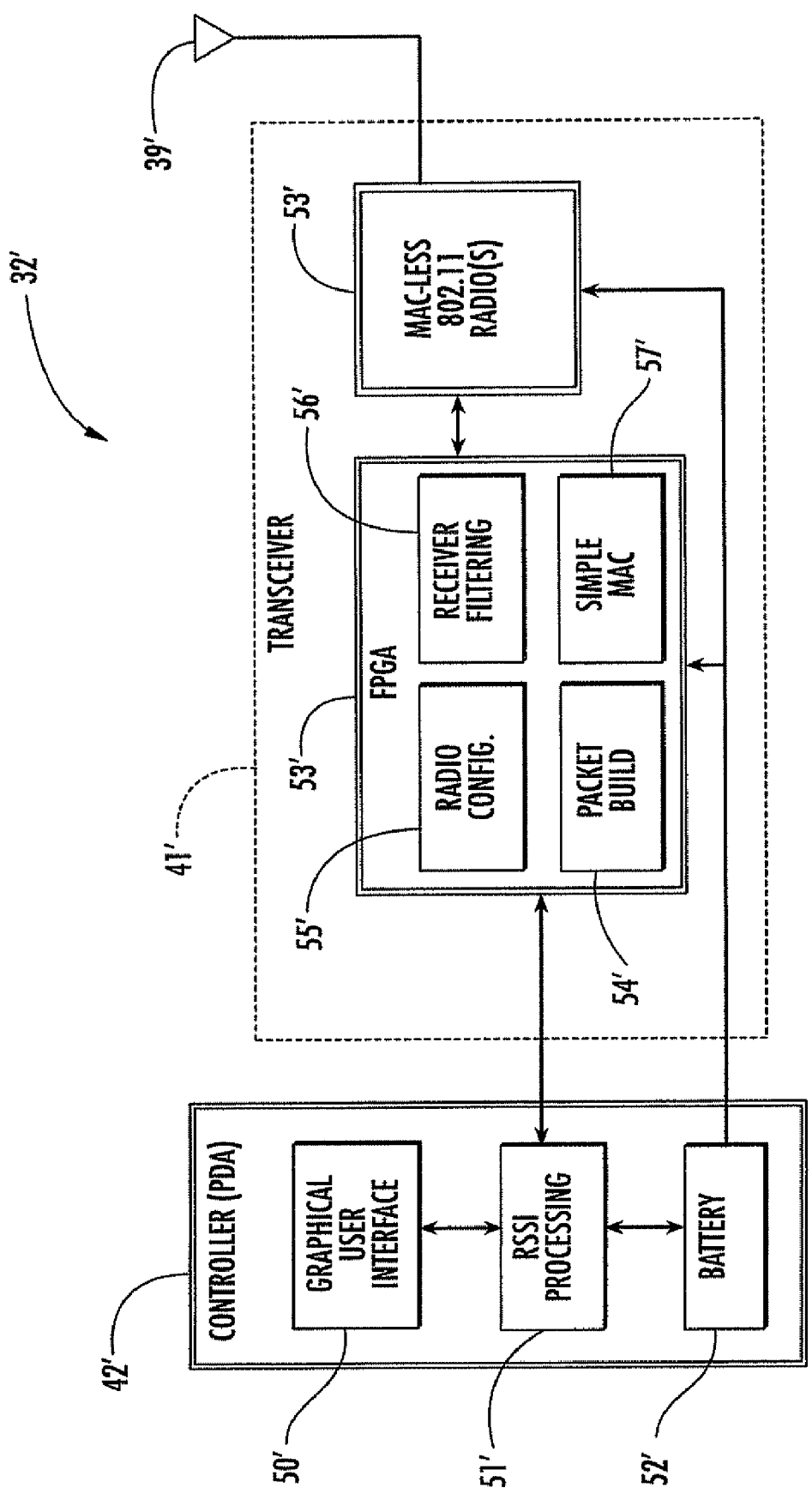
FIG. 4 is a schematic block diagram illustrating an embodiment of the wireless device locator of FIG. 2 for a WLAN implementation.
Figure 5:
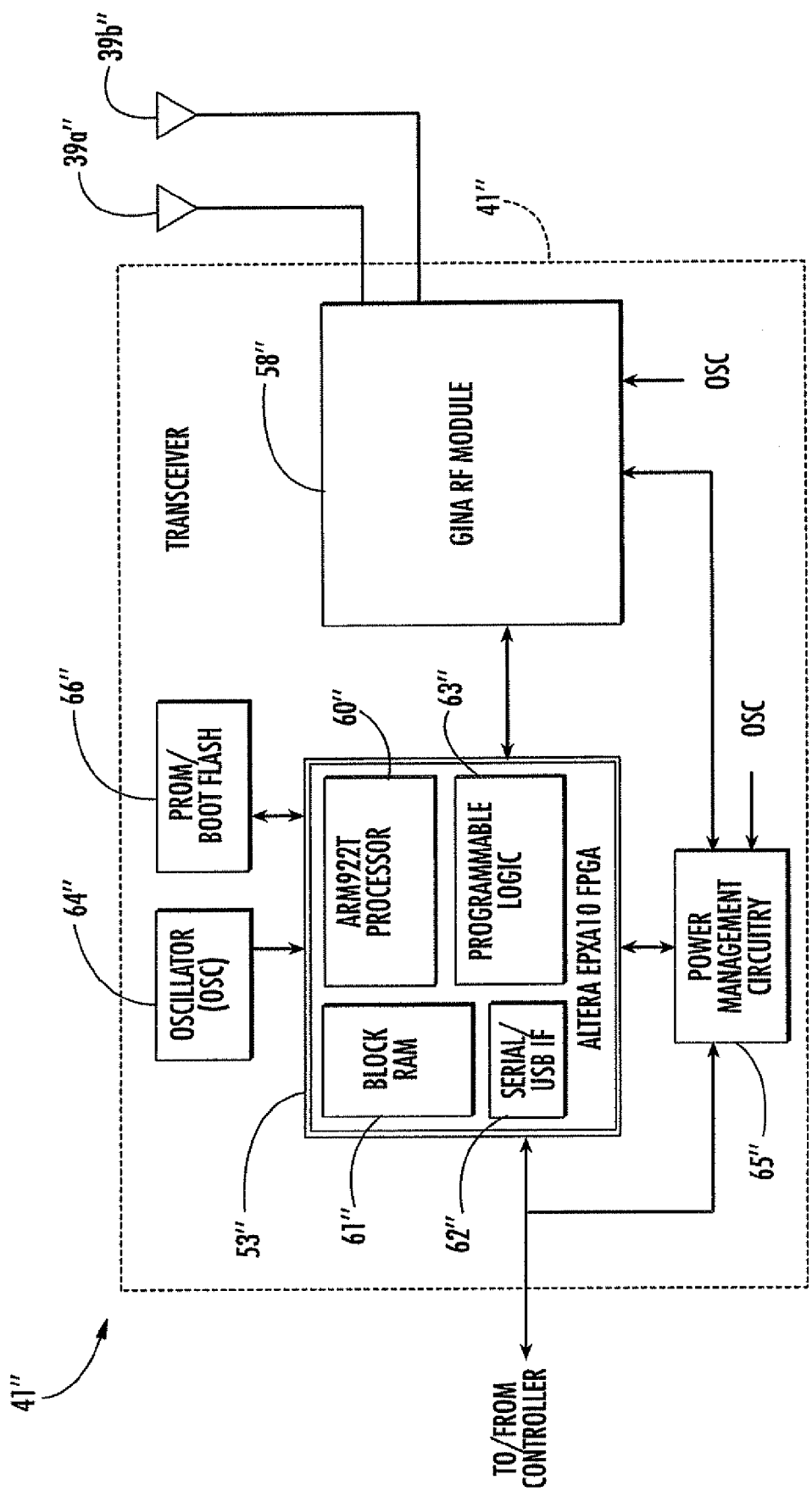
FIG. 5 is a schematic block diagram illustrating in greater detail an embodiment of the transceiver of the wireless device locator of FIG. 4.

An exemplary embodiment of the present invention is now described with reference to FIGS. 4 and 5. The wireless device locator 32' may use a personal data assistant (PDA) as the controller 42', although a personal computer (PC) or other suitable computing device may also be used. More particularly, the PDA 42' illustratively includes a graphical user interface (GU1) 50', and a received signal strength indication (RSSI) processing module 51' for cooperating with the transceiver 41' to perform above described range estimation processing operations. More particularly, the RSSI module 51' may be implemented as a software module which is run on the PDA 42', as will be appreciated by those skilled in the art, and which cooperates with the GUI to provide range estimates to a user.

The PDA 50' also illustratively includes a battery 52', which may conveniently be used for powering the various transceiver 41' components, as shown. Of course, it will be appreciated that separate batteries may be used, or one or more components of the wireless device locator 32' may be powered by an external (e.g., AC) source. The transceiver 41' operates in accordance with the IEEE 802.11b standard and includes a MAC-less 802.11b radio 58' and a field-programmable gate array (FPGA) 53' connected thereto. The FPGA 53' illustratively includes a packet building module 54', a radio configuration module 55', a receiver filtering module 56', and a simple MAC processing module 57' for processing the location finding signals and reply signals and communicating with the radio 53', in accordance with the 802.11b standard, as will be appreciated by those skilled in the art.

More specifically, the MAC-less radio 58' may be a GINA model EF module from GRE America, Inc., and the FPGA 53' may be a module EPXA10 from Altera Corp. The hardware components of the FPGA 53" illustratively include an ARM922T processor 60", block RAM 61" therefor, a serial/universal serial bus (USB) interface 62", and a programmable logic section 63". Additional circuitry including an oscillator 64", power management circuitry (i.e., regulators, microprocessor supervisor, etc.) 65", and a programmable read-only memory (PROM)/boot flash memory 66" are connected thereto as shown, as will be appreciated by those skilled in the art.

Figure 6:
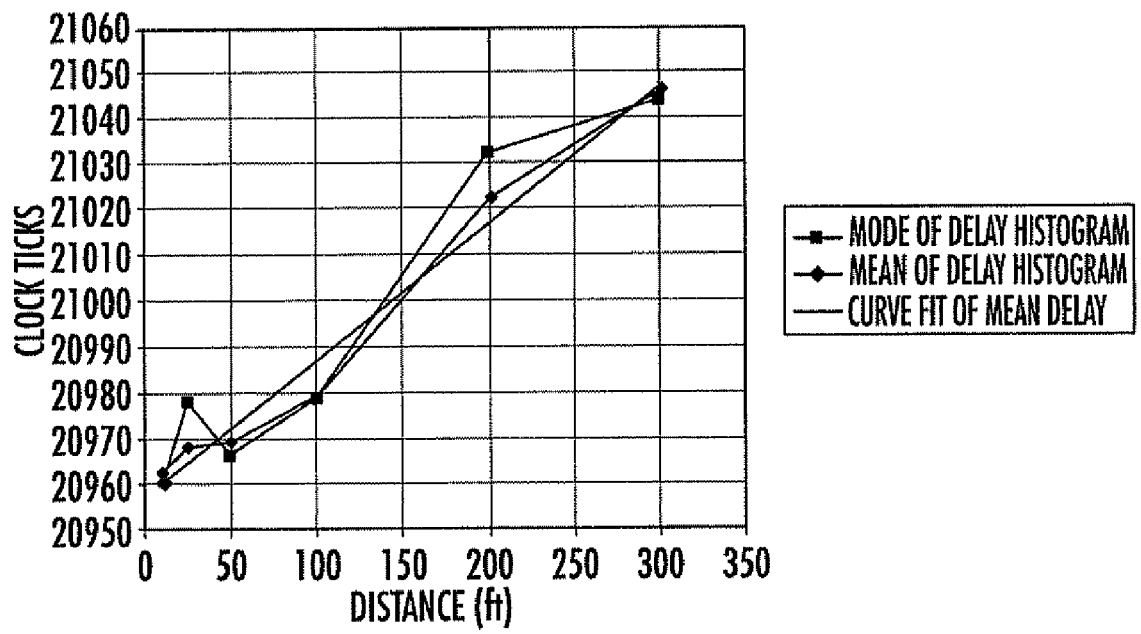
FIGS. 6 and 7 are histograms illustrating range estimation test results performed using the wireless device locator of FIG. 4.
Figure 7:
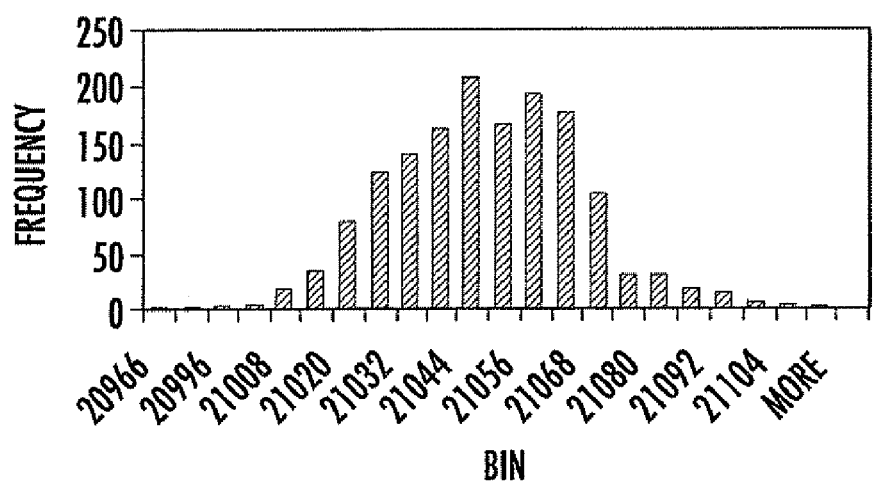

Referring now to FIGS. 6-7, a test was conducted in accordance with the present invention in which approximately 1500 location finding signals were transmitted to a stationary wireless IEEE 802.11 device. The time it took to receive the reply signal was measured by ticks of an internal clock of the controller 42, where each tick represents 7.567 ns. From FIG. 6 it may be seen that the reply signals from the target device were returned within between about 20,960 and 21,045 clock ticks, where the transmission of the respective location signals each began at 0 clock ticks. Moreover, if this range is divided into equal sections or bins, the frequency (i.e., number) of round trip times that fell within each of the bins is shown in FIG. 7.

Plotting various statistical functions of the measured clock tick samples (such as the mean and the mode) versus the known distance to the target device allowed statistical curve-fitting to take place, as shown in FIG. 6. It was determined from the test results that taking the mean of the samples provided the most accurate range estimation. More particularly, the ranges to several 802.11b target devices at varying distances were estimated using this approach, and the worst case error for the estimated range was never more than 20 ft. Preferably, the location finding signals are transmitted over a relatively short interval (a few seconds or less) so that if the target device is moving the accuracy of the results will not be significantly diminished. Of course, various numbers of location finding signals and transmission intervals may be used depending upon the particular implementation, as will be appreciated by those skilled in the art.

Figure 8:
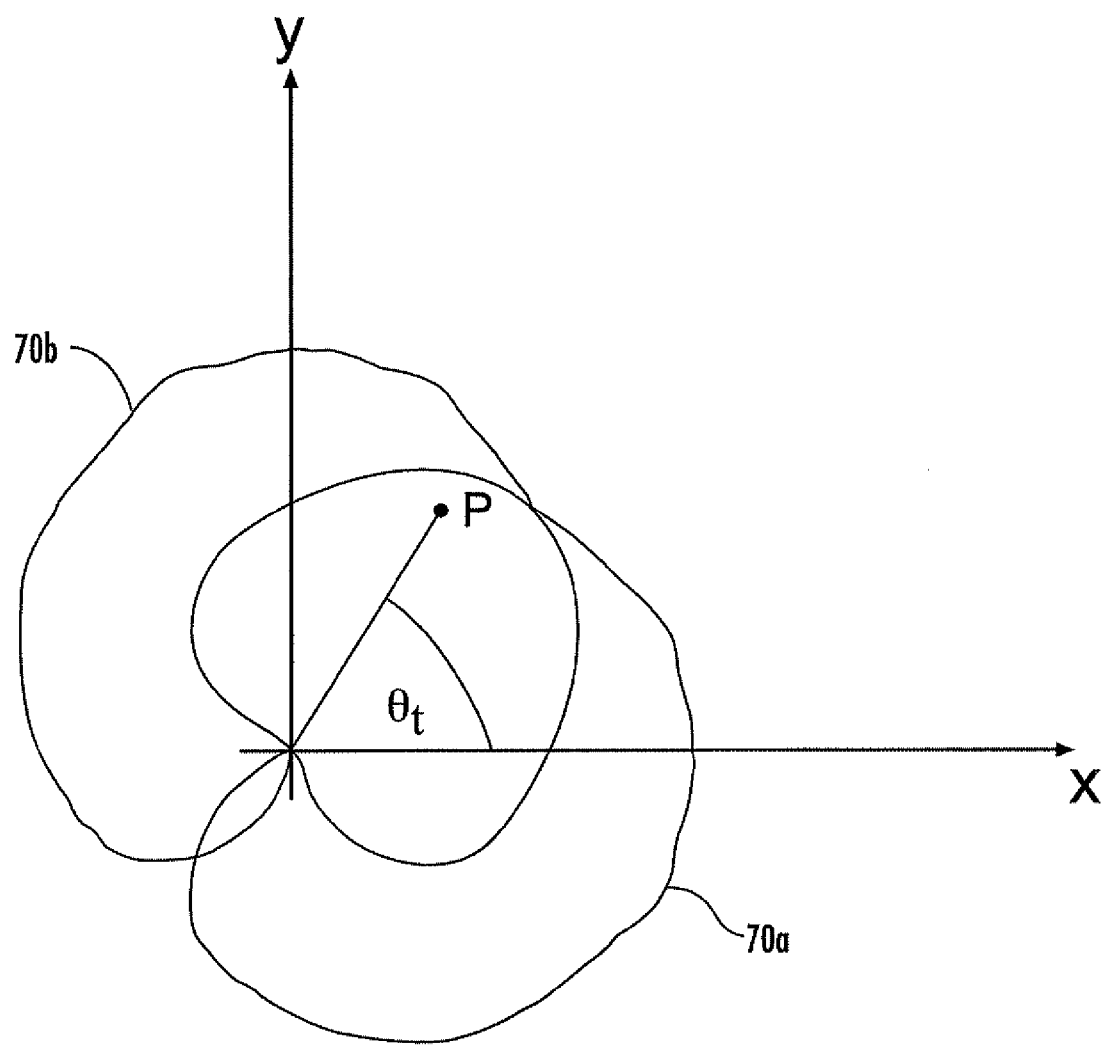
FIG. 8 is a graph illustrating bearing determination in accordance with the present invention.

In accordance with another advantageous aspect of the invention, multiple antennas 39a", 39b" (FIG. 5) may be used to provide target bearing in addition to the estimated range. Referring more particularly to FIG. 8, bearing determination in the case where the antennas 39a", 39b" are directional antennas will now be described. The antennas 39a", 39b" have respective reception patterns 70a, 70b, which may be orthogonal to one another (i.e., the former is directed along the x-axis, while the latter is directed along the y-axis).

The target device is at a point P, which is within the reception patterns 70a, 70b. Each of the antenna gain patterns 70a and 70b can be measured and known to the locator, and represented by gain functions $G1(\theta)$ and $G2(\theta)$ where e represents the angle of deviation from a particular reference direction.

As such, to determine the line of bearing to the target device, the received signal strength is measured from each of the antennas 70a, 70b, respectively. Based upon this information, the controller 42' may then find the angle $\theta_t$ using the relationship $G1(\theta_t)-G2(\theta_t)=P1-P2$, where P1 and P2 is the received signal power off antenna 1 and antenna 2, respectively. In other words, the difference in the signal strength received between the two antennas (P1-P2) should equal the difference in the antenna gain of the two antennas at the angle of the line of bearing $(G1(\theta_t)-G2(\theta_t))$ Thus, the target line of bearing to the target device is at $\theta_t$. It should be noted that it is possible that more than one angle $\theta$ may satisfy the relationship $G1(\theta_t)-G2(\theta_t)=P1-P2$. These multiple angles represent a line of bearing ambiguity that can easily be resolved by making multiple measurements, as can be appreciated by those skilled in the art.

As noted above, more than one transceiver 41' may be used in certain embodiments, which would allow signal strength measurements to be taken based upon a same reply signal from the target device. However, if only a single transceiver 41' is used, the controller 42' may alternate which antenna 70a, 70b is receiving and measure the received signal strength of successive signals, for example. Moreover, the bearing may be determined in three dimensions, if desired, which may be particularly useful for locating wireless communications devices within a multi-story building, for example, as will be appreciated by those skilled in the art.

Figure 9:
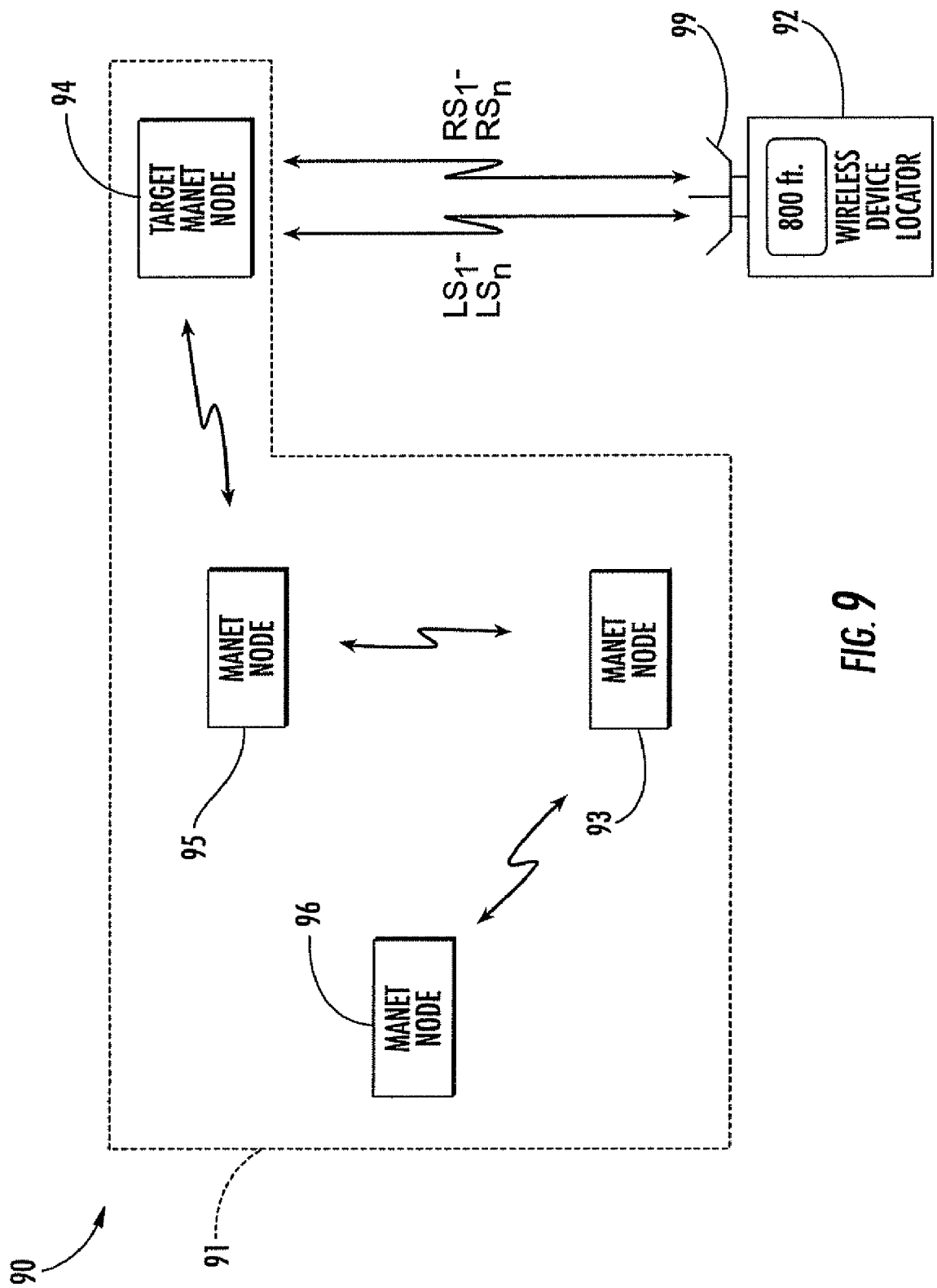
FIGS. 9 and 10 are schematic block diagrams illustrating alternate embodiments of the wireless communications system of FIG. 1 including a mobile ad-hoc network (MANET) and a cellular network, respectively.

While the present invention has been described above with reference to a WLAN wireless device locator 32', it will be appreciated by those skilled in the art that it may also be used in other wireless communications systems with other types of wireless communications devices. Referring more particularly to FIG. 9, a mobile ad-hoc network (MANET) system 90 illustratively includes a wireless device locator 92 including an antenna 99, such as those described above, and a MANET 91. More particularly, the MANET includes MANET nodes or devices 93-96, of which the node 94 is the target node in the illustrated example. Here, the wireless device locator 92 performs range and/or bearing estimation in the same manner described above, except that it will operate in accordance with the appropriate MANET protocol used within the system 90, as will be appreciated by those skilled in the art.

Figure 10:
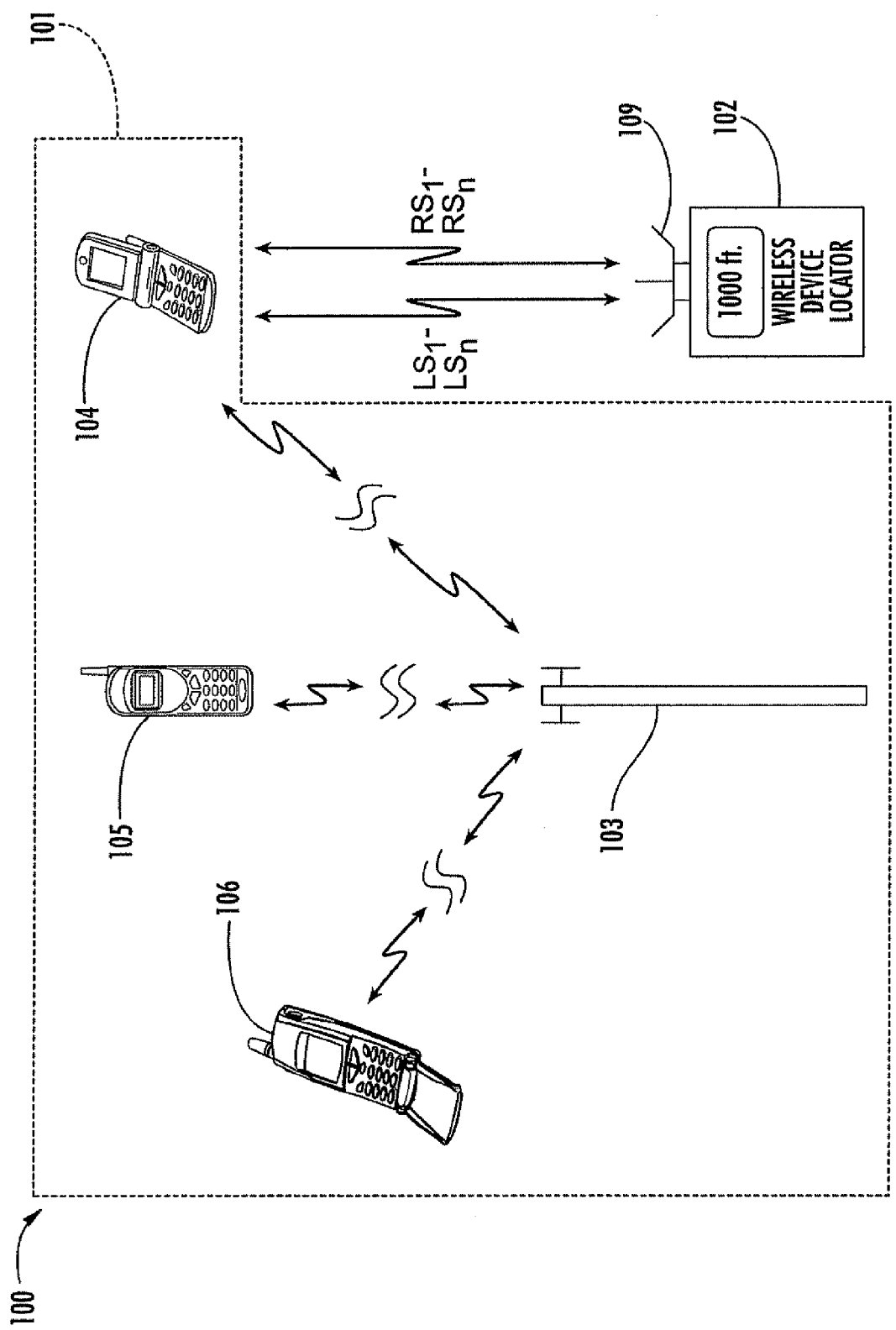

Another embodiment is illustrated in FIG. 10, in which a wireless device locator 102 having an antenna 109 is used within a cellular communications system 100 for locating cellular devices (e.g., cellular telephones) 104-106 in cellular network 101. The cellular devices 104-106 place and receive calls via a cellar tower 103, as will be appreciated by those skilled in the art. In the illustrated example, the target device is the cell phone 104. Here again, the wireless device locator 102 will communicate using the appropriate operating protocol being used in the cellular network 101 (e.g., code-division multiple access (CDMA), short message service (SMS), etc.), as will be appreciated by those skilled in the art.

Figure 11:
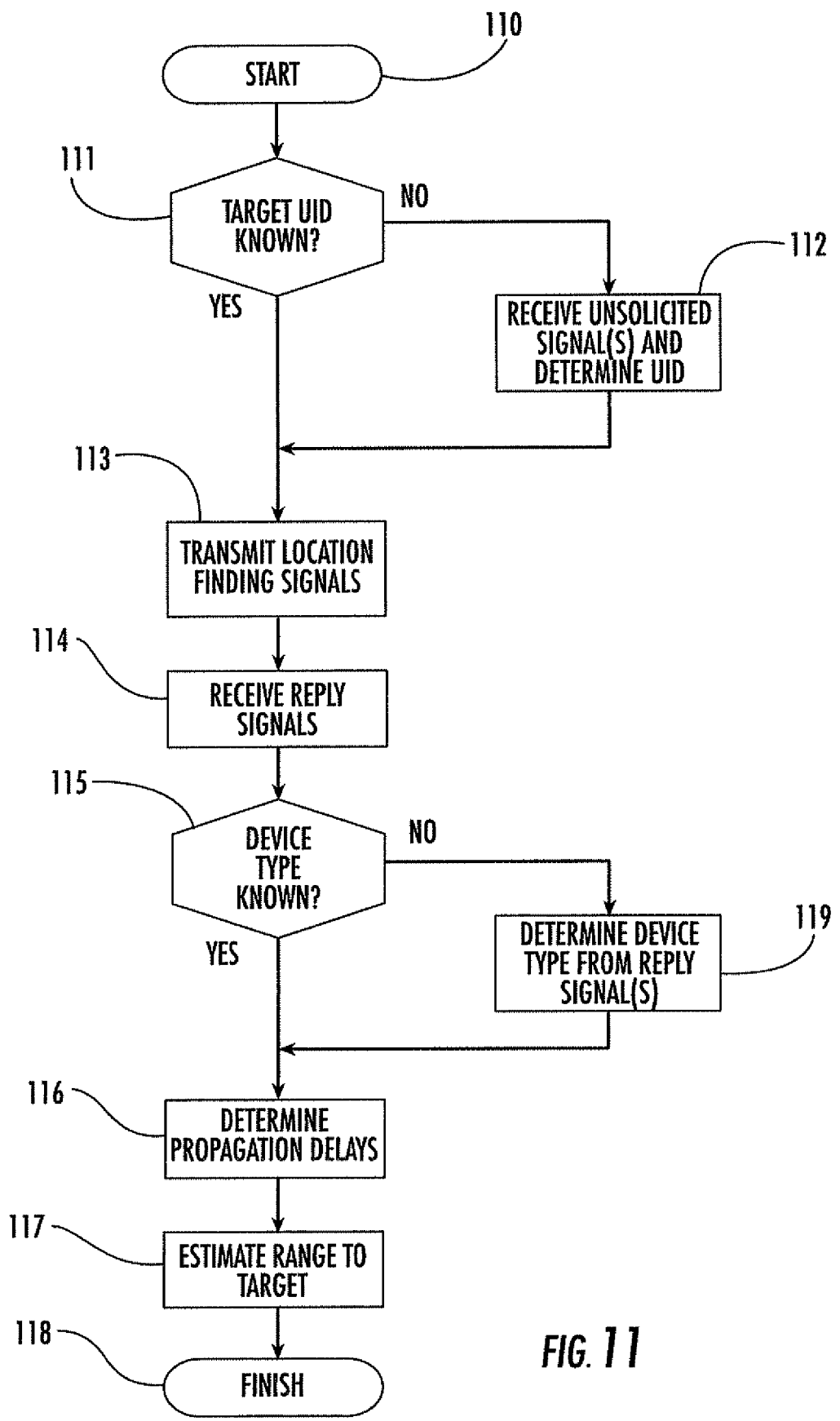
FIG. 11 is a flow diagram illustrating a wireless device location method in accordance with the present invention.

Turning now additionally to FIG. 11, a method aspect of the invention is for locating a target wireless communications 34 device from among a plurality of wireless communications devices 34-36. Beginning at Block 110, if the UID for the target device 34 is unknown, the controller 42 may determine the UID from unsolicited signals transmitted by the target device, for example, as described above (Block 112). Of course, in some embodiments, the controller 42 may download the signals from a network access point 33, etc., as also described above.

Once the UID for the target wireless communication device 34 is known, location finding signals are transmitted to the target wireless communications device, at Block 113, and respective reply signals for each of the location finding signals are received therefrom, at Block 114. If the device type (and, thus, the known device latency) are known, at Block 115, then the propagation delay associated with the transmission of each location finding signal and the respective reply signal therefor is determined based upon the known device latency of the target wireless communications device 34, at Block 116. As such, a range to the target wireless communications device 34 is estimated based upon a plurality of determined propagation delays (Block 117), as previously discussed above, thus concluding the illustrated method (Block 118).

Of course, if the device type is unknown, the controller 42 may determine the device type from the reply signal (Block 119), as discussed above, or by other suitable methods which will be appreciated by those skilled in the art. It should be noted that while this step is shown as occurring after the receipt of the reply signals in the illustrated example, the device type determination may be performed prior thereto, such as while determining the UID, for example.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications system comprising:
a plurality of wireless communications devices each having a device type associated therewith from among a plurality of different device types, and each device type having a known device latency associated therewith; and
a wireless device locator comprising
at least one antenna and a transceiver connected thereto, and
a controller for cooperating with said transceiver for transmitting a plurality of location finding signals to a target wireless communications device from among said plurality of wireless communications devices;
said target wireless communications device transmitting a respective reply signal for each of said location finding signals;

said controller of said wireless device locator also for
cooperating with said transceiver for receiving the
reply signals,
determining a propagation delay associated with the
transmission of each location finding signal and the
respective reply signal therefor based upon the
known device latency of said target wireless communications device, and
estimating a range to said target wireless communications device based upon a plurality of determined propagation delays.

2. The wireless communications system of claim 1 wherein said controller estimates the range based upon an average of the propagation delays.

3. The wireless communications system of claim 1 wherein said at least one antenna comprises a plurality of antennas; and wherein said controller cooperates with said plurality of antennas to determine a bearing to said target wireless communications device based upon at least one of the received reply signals.

4. The wireless communications system of claim 3 wherein the bearing is a three-dimensional bearing.

5. The wireless communications system of claim 1 wherein said at least one antenna comprises at least one directional antenna.

6. The wireless communications system of claim 1 wherein said wireless device locator further comprises a portable housing carrying said at least one antenna, said transceiver, and said controller.

7. The wireless communications system of claim 1 wherein said wireless communications devices comprise wireless local area network (WLAN) devices.

8. The wireless communications system of claim 1 wherein said wireless communications devices comprise mobile ad-hoc network (MANET) devices.

9. The wireless communications system of claim 1 wherein said wireless communications devices comprise cellular communications devices.

10. A wireless communications system comprising:
a plurality of wireless local area network (WLAN) devices each having a device type associated therewith from among a plurality of different device types, and each device type having a known device latency associated therewith; and
a wireless device locator comprising
at least one antenna and a transceiver connected thereto, and
a controller for cooperating with said transceiver for transmitting a plurality of location finding signals to a target WLAN device from among said plurality of WLAN devices;
said target WLAN device transmitting a respective reply signal for each of said location finding signals;
said controller of said wireless device locator also for
cooperating with said transceiver for receiving the reply signals,
determining a propagation delay associated with the transmission of each location finding signal and the respective reply signal therefor based upon the known device latency of said target WLAN device, and
estimating a range to said target WLAN device based upon an average of a plurality of determined propagation delays.

11. The wireless communications system of claim 10 wherein said at least one antenna comprises a plurality of antennas; and wherein said controller cooperates with said plurality of antennas to determine a bearing to said target WLAN device based upon at least one of the received reply signals.

12. A wireless device locator for locating a target wireless communications device comprising:
at least one antenna and a transceiver connected thereto; and
a controller for
cooperating with said transceiver for transmitting a plurality of location finding signals to the target wireless communications device and receiving a respective reply signal therefrom for each of said location finding signals,
determining a propagation delay associated with the transmission of each location finding signal and the respective reply signal therefor based upon a known device latency of the target wireless communications device, and
estimating a range to the target wireless communications device based upon a plurality of determined propagation delays.

13. The wireless device locator of claim 12 wherein said controller estimates the range based upon an average of the propagation delays.

14. The wireless device locator of claim 12 wherein said at least one antenna comprises a plurality of antennas; and wherein said controller cooperates with said plurality of antennas to determine a bearing to the target wireless communications device based upon at least one of the received reply signals.

15. The wireless device locator of claim 12 wherein said at least one antenna comprises at least one directional antenna.

16. The wireless device locator of claim 12 wherein said wireless device locator further comprises a portable housing carrying said at least one antenna, said transceiver, and said controller.

17. The wireless device locator of claim 12 wherein the target wireless communications device comprises a wireless local area network (WLAN) device.

18. The wireless device locator of claim 12 wherein the target wireless communications device comprises a mobile ad-hoc network (MANET) device.

19. The wireless device locator of claim 12 wherein the target wireless communications device comprises a cellular communications device.

20. A method for locating a target wireless communications device from among a plurality of wireless communications devices, each wireless communications device having a device type associated therewith from among a plurality of different device types, and each device type having a known device latency associated therewith, the method comprising:
using a controller cooperating with a transceiver for transmitting a plurality of location finding signals to the target wireless communications device, and receiving a respective reply signal for each of the location finding signals therefrom;
using the controller for determining a propagation delay associated with the transmission of each location finding signal and the respective reply signal therefor based upon the known device latency of the target wireless communications device; and
further using the controller for estimating a range to the target wireless communications device based upon a plurality of determined propagation delays.

21. The method of claim 20 wherein the controller estimates the range based upon an average of the propagation delays.

22. The method of claim 20 further comprising determining a bearing to the target wireless communications device based upon at least one of the received reply signals.

23. The method of claim 20 wherein the target wireless communications device comprises a wireless local area network (WLAN) device.

24. The method of claim 20 wherein the target wireless communications device comprises a mobile ad-hoc network (MANET) device.

25. The method of claim 20 wherein the target wireless communications device comprises a cellular communications device.

* * * * *